US008640994B1

(12) United States Patent
Cosner et al.

(10) Patent No.: US 8,640,994 B1
(45) Date of Patent: Feb. 4, 2014

(54) AGILE DEDICATED SPACECRAFT FOR SPINNING MICROWAVE IMAGERS AND SOUNDERS

(75) Inventors: Christopher M. Cosner, Manhattan Beach, CA (US); Dennis Y. Nakasone, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 12/891,094

(22) Filed: Sep. 27, 2010

(51) Int. Cl.
*B64G 1/10* (2006.01)
*B64G 1/66* (2006.01)
*B64G 1/28* (2006.01)

(52) U.S. Cl.
USPC ............ 244/173.1; 244/158.1; 244/164

(58) Field of Classification Search
USPC .................. 244/158.1, 164, 165, 173.1
See application file for complete search history.

(56) References Cited

U.S. PATENT DOCUMENTS

| 3,229,930 | A | * | 1/1966 | Fedor et al. | 244/158.1 |
|---|---|---|---|---|---|
| 3,341,151 | A | * | 9/1967 | Kampinsky | 244/158.1 |
| 4,009,851 | A | * | 3/1977 | Cable | 244/173.1 |
| 4,345,728 | A | * | 8/1982 | Neufeld | 244/168 |
| 4,470,568 | A | * | 9/1984 | Nuefeld | 244/164 |
| 4,725,024 | A | * | 2/1988 | Vorlicek | 244/164 |
| 4,752,884 | A | * | 6/1988 | Slafer et al. | 701/13 |
| 5,169,094 | A | * | 12/1992 | Maute et al. | 244/158.1 |
| 5,441,222 | A | * | 8/1995 | Rosen | 244/165 |
| 5,935,176 | A | * | 8/1999 | Nielson | 701/4 |
| 6,076,773 | A | * | 6/2000 | Salvatore | 244/164 |
| 6,082,678 | A | * | 7/2000 | Maute | 244/169 |
| 6,152,402 | A | * | 11/2000 | Augenstein | 244/164 |
| 6,196,502 | B1 | * | 3/2001 | Eyerly | 244/165 |
| 6,288,671 | B1 | * | 9/2001 | Wu et al. | 342/357.37 |
| 6,463,365 | B1 | * | 10/2002 | Anagnost et al. | 701/13 |
| 6,553,286 | B2 | * | 4/2003 | Turner et al. | 701/13 |
| 7,624,948 | B2 | * | 12/2009 | Goodzeit | 244/164 |
| 7,739,003 | B2 | * | 6/2010 | Johnson | 701/4 |
| 2002/0089588 | A1 | * | 7/2002 | LeCompte | 348/144 |
| 2005/0230559 | A1 | * | 10/2005 | Chiang et al. | 244/165 |
| 2006/0118677 | A1 | * | 6/2006 | Goodzeit | 244/164 |
| 2007/0228220 | A1 | * | 10/2007 | Behrens et al. | 244/172.5 |

FOREIGN PATENT DOCUMENTS

JP        64000484 A * 1/1989 ............ C01W 1/08

OTHER PUBLICATIONS

National Oceanic and Atmospheric Administration, National Polar-orbiting Operational Environmental System (NOAA NPOESS) web site. http://www.ipo.noaa.gov/index.php, Feb. 2, 2009.

* cited by examiner

*Primary Examiner* — Joseph W Sanderson
(74) *Attorney, Agent, or Firm* — Vista IP Law Group LLP; Cynthia A. Dixon

(57) ABSTRACT

A system, method, and apparatus are disclosed for agile dedicated spacecrafts for spinning microwave imagers and sounders. In one or more embodiments, the system, method, and apparatus involve an agile, zero net-momentum, spinning space vehicle, which includes a body and an instrument package. In one or more embodiments, the instrument package is mounted directly onto the body such that the space vehicle can point the instrument package not only along the space vehicle's orbital velocity vector, but in any direction within the space vehicle's field of regard. The space vehicle's spin axis is aligned with the instrument package's scan axis. The space vehicle experiences zero net-momentum on orbit by including a counter-rotating momentum storage device. In one or more embodiments, the instrument package is a scanning microwave imaging/sounding instrument, which is utilized as an Earth climate and weather sensor.

22 Claims, 5 Drawing Sheets

Scan₃ (time₃)

Scan₂ (time₂)

Scan₁ (time₁)

Agile Scan₃ (time₃)
Agile Scan₂ (time₂)
Agile Scan₁ (time₁)

AGILE DEDICATED SPACECRAFT FOR SPINNING MICROWAVE IMAGERS AND SOUNDERS

BACKGROUND

The present disclosure relates to agile dedicated spacecrafts. In particular, it relates to agile dedicated spacecrafts for spinning microwave imagers and sounders.

SUMMARY

The present disclosure relates to an apparatus, method, and system for agile dedicated spacecrafts for spinning microwave imagers and sounders. In one or more embodiments of the present disclosure, an agile, zero net-momentum, spinning space vehicle involves a body and an instrument package. The instrument package is mounted directly onto the body such that the space vehicle can point the instrument package not only along the space vehicle's orbital velocity vector, but in any direction within the space vehicle's field of regard. The space vehicle's spin axis is aligned with the instrument package's scan axis. The space vehicle employs zero net-momentum on orbit by integrating the instrument package directly with the body and including a counter-rotating momentum storage device. In one or more embodiments, the counter-rotating momentum storage device is employed by a momentum wheel and/or a control-moment gyro (CMG).

In one or more embodiments, the instrument package is a scanning microwave imaging/sounding instrument. In some embodiments, the scanning microwave imaging/sounding instrument is utilized as an Earth climate and weather sensor. In other embodiments, the instrument package is a scanning optical sensor for deep space observation. In alternative embodiments, the instrument package is a scanning communication device.

In some embodiments, the scan axis of the instrument package is aligned towards Earth for Earth scanning. In at least one embodiment, the scan axis of the instrument package is aligned towards space for deep space scanning. The system of the present disclosure may employ various types of satellites for the agile, zero net-momentum, spinning space vehicle. The types of satellites that may be used include, but are not limited to, low earth orbiting (LEO) satellites, medium earth orbit (MEO) satellites, geosynchronous earth orbit (GEO) satellites, and interplanetary space vehicles.

In one or more embodiments, the instrument package of the agile, zero net-momentum, spinning space vehicle includes at least one satellite antenna subsystem. In some embodiments, the instrument package includes at least one star sensor. In at least one embodiment, the instrument package includes at least one heater disk. In one or more embodiments, the space vehicle further includes solar panels that are located on the space vehicle's exterior surface. In at least one embodiment, the instrument package performs rapid, successive scans of the same region, thereby allowing for back-differencing signal processing techniques to be employed.

In some embodiments, a method for providing an agile, zero net-momentum, spinning space vehicle, involves providing a body and an instrument package. The method further involves mounting the instrument package directly onto the body such that the space vehicle can point the instrument package not only along the space vehicle's orbital velocity vector, but in any direction within the space vehicle's field of regard. In one or more embodiments, the space vehicle's spin axis is aligned with the instrument package's scan axis. In at least one embodiment, the method further involves a counter-rotating momentum storage device (e.g., a momentum wheel and/or control-moment gyro), thereby causing the space vehicle to experience zero net-momentum on orbit. In some embodiments, the instrument package is a scanning microwave imaging/sounding instrument.

DRAWINGS

These and other features, aspects, and advantages of the present disclosure will become better understood with regard to the following description, appended claims, and accompanying drawings where:

DESCRIPTION

Figure 1:
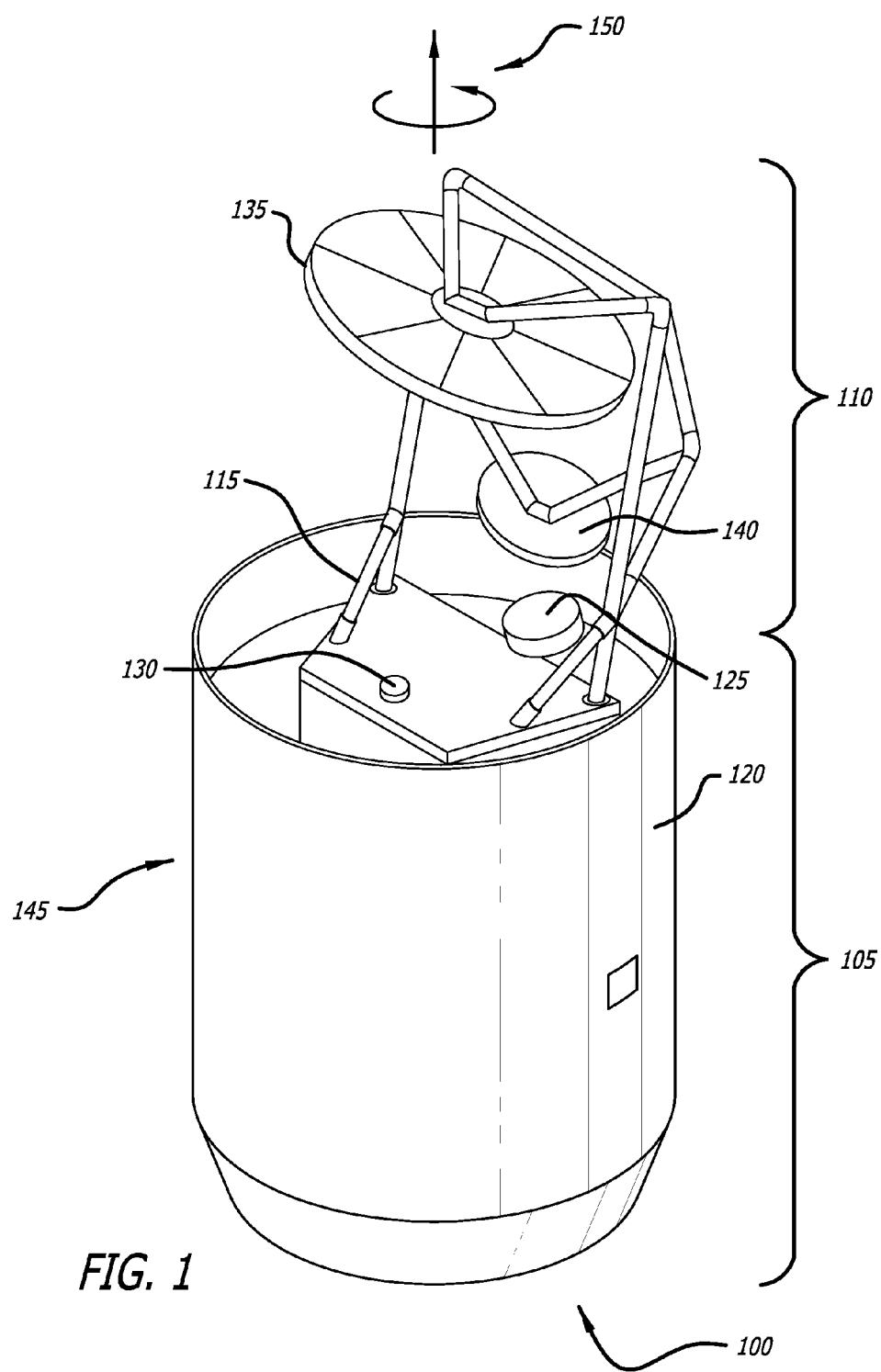
FIG. 1 illustrates a pictorial representation of a scanning Earth observer satellite, in accordance with at least one embodiment of the present disclosure.

The methods and apparatus disclosed herein provide an operative system for agile dedicated spacecrafts. Specifically, this system relates to agile dedicated spacecrafts for spinning microwave imagers and sounders.

The methods and apparatus of the present disclosure relate to a concept for an agile spinning space vehicle that hosts a microwave imaging/sounding instrument. The spinning nature of the disclosed agile spinning space vehicle design simplifies the prior art spinning space vehicle design configurations by eliminating rotating interfaces and by providing a direct mounting interface on the space vehicle body for the microwave imaging/sounding instrument.

This disclosed mission-dedicated, agile spinning space vehicle enhances weather sensing products by allowing the microwave instrument to vary its line-of-sight relative to the orbital velocity vector due to its use of a zero-momentum spinner control system, and by eliminating concerns of dynamic interactions between instruments that are typical of large conglomerate space vehicles. The disclosed agile spinning space vehicle design provides a dedicated, low cost, spacecraft that allows for the microwave instrument to provide a greater amount of weather and Earth climate data than the microwave instruments employed with prior art spinning space vehicles.

Prior art existing solutions for spinning space vehicles mount the microwave imager/sounder on a bearing and power transfer assembly placed on a spacecraft with a line of sight fixed relative to the orbital velocity vector. The momentum of the spinning instrument is canceled via the use of momentum wheels in order to maintain the overall space vehicle's momentum state. These existing prior art solutions are not agile.

There are many disadvantages to these prior art existing solutions. One disadvantage is that these prior art existing solutions require large, complex, expensive space vehicles. Another disadvantage of these prior art existing solutions is that they require complex, heavy, and expensive instrument mounts, bearings, and power transfer assemblies. Yet another disadvantage is that these prior art existing solutions limit collections or instrument operations along the orbital velocity vector. And, yet another disadvantage of these prior art existing solutions is that they are not agile. Also, another disadvantage is that these prior art existing solutions require precise dynamic balancing of the spinning instrument in order to minimize wobble disturbances being transmitted to other sensors on the large conglomerate space vehicle.

The disclosed system allows for the use of a low-cost, dedicated, space vehicle for microwave imaging and sounding missions to monitor the Earth's weather and climate changes. Three-axis controlled space vehicles are typically used for Earth climate monitoring. However, spinning spacecraft are simpler and, generally, of lower cost to build than three-axis controlled space vehicles. Traditional spin-stabilized spacecraft are not used for earth climate monitoring because they have very limited slew maneuverability. However, the disclosed agile, zero net-momentum, spinning space vehicle provides the slew maneuverability of a three-axis controlled space vehicle, while employing a spinning spacecraft configuration. The disclosed agile, zero net-momentum, spinning space vehicle has an advantage over the conventional three-axis controlled space vehicle because it has an unobstructed view of its sensor throughout its rotation. Conversely, the three-axis controlled space vehicle has its spinning sensor integrated with multiple other sensors and, thus, is blocked in some part of its rotation by these other instruments.

The disclosed agile, zero-momentum, spinning spacecraft for space-based microwave imaging and sounding can be used to monitor weather and climate change. The agile, zero-momentum spacecraft bus, depending upon its mission configuration, can provide greater than (1) degree per second of slew rate, better than one milliradian pointing control, and can provide over one (1) kilowatt (kW) of electrical power to support the payload operations. The disclosed spinning space vehicle is compact and lightweight and, thus, it can be launched on smaller, low-cost, launch vehicles.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Earth Observers

FIG. 1 illustrates a pictorial representation of a scanning Earth observer satellite 100, in accordance with at least one embodiment of the present disclosure. In this figure, the scanning Earth observer satellite 100 is shown to include a body 105 and an instrument package 110. In one or more embodiments, the body 105 includes a mounting interface 115 and solar panels 120, which are located on the exterior surface of the satellite's body 105. The mounting interface 115 is used to mount the satellite's instrument package 110 onto the satellite's body 105. In at least one embodiment, the instrument package 110 includes an antenna subsystem, at least one heater disk 125, and at least one star sensor 130. In this figure, the antenna subsystem is shown to include a large low frequency reflector antenna 135 and a small high frequency reflector antenna 140. In the embodiment depicted in this figure, the instrument package's 110 field of view 145 is the same as the field of view of the large low frequency reflector antenna 135. It should be noted that in one or more embodiments, various different types of antennas may be employed for the antenna subsystem of the present disclosure.

The satellite 100 uses a zero-momentum, spinner control, system architecture that allows it to be used for space-based, spinning, microwave imager/sounder weather sensing missions. This unique, simplified, space-vehicle configuration is achieved by directly mounting the instrument package 110 onto the satellite's body 105 such that the satellite's 100 spin axis 150 is aligned with the instrument package's 110 scan axis 150. This disclosed design combines the benefits of using an agile, zero-momentum, control system with the cost benefits of using a spinner configuration. This zero-momentum spinner concept provides the required slew agility and precision needed to point the sensor instruments to various desired locations within the Earth's atmosphere. Also, since this concept provides a simple and low cost space vehicle design, its microwave imager/sounder instrument 110 may be utilized for government Earth climate and weather studies.

Unlike the current conventional microwave imager/sounder instrument solutions, which require a spinning platform mounted on a non-agile, low-earth-altitude, space vehicle, the disclosed spinning space vehicle design allows for a simple, low-cost dedicated agile spinning spacecraft 100 that has its instrument package 110 directly mounted onto its body 105. The disclosed agile, spinning, space vehicle can point its instrument package 110 not only along its orbital velocity vector, but in any direction within the space vehicle's field of regard 145.

Figure 2:
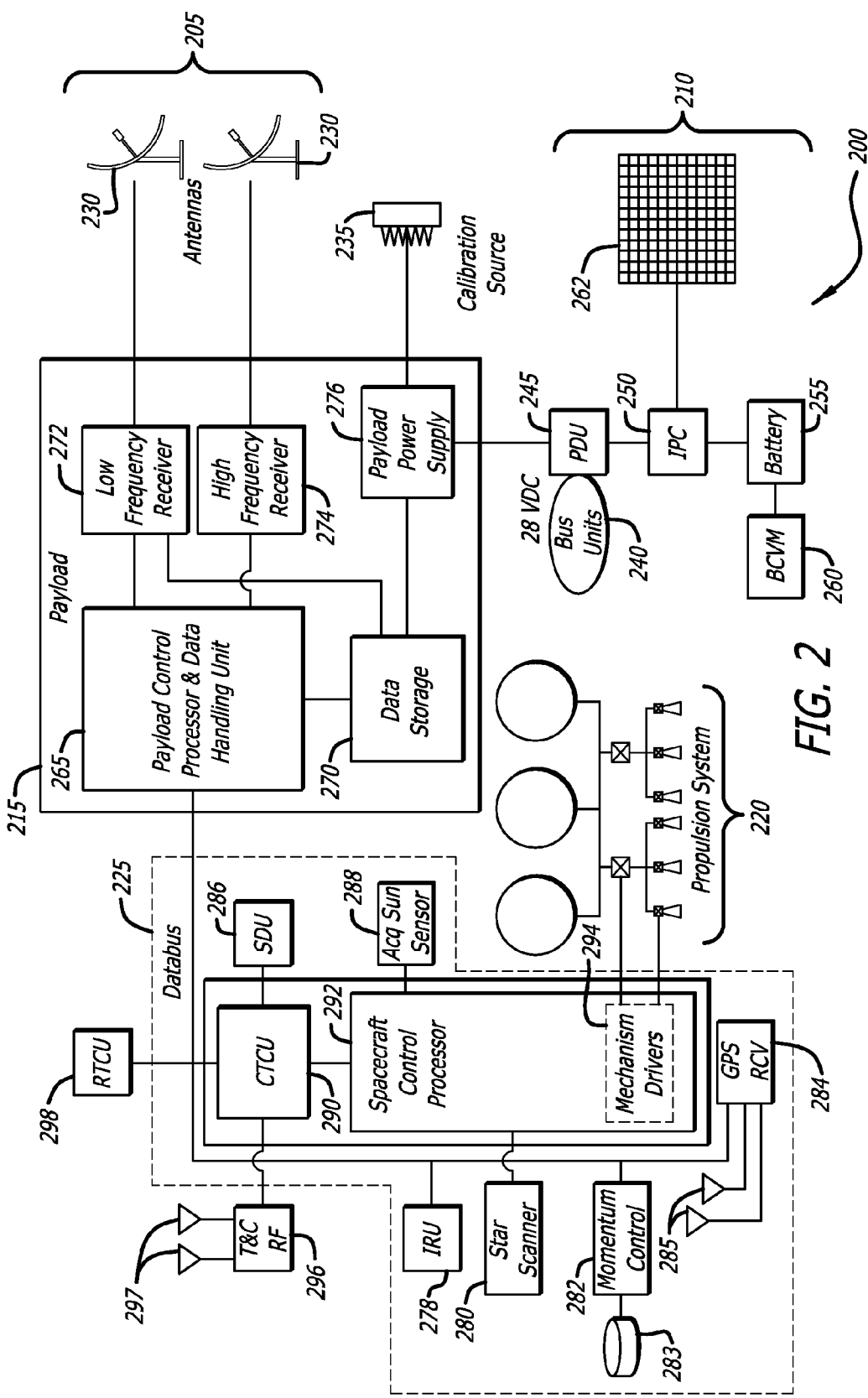
FIG. 2 shows a space vehicle block diagram of the scanning Earth observer satellite design of FIG. 1, in accordance with at least one embodiment of the present disclosure.

FIG. 2 shows a space vehicle block diagram 200 of the scanning Earth observer satellite design of FIG. 1, in accordance with at least one embodiment of the present disclosure. In this figure, the space vehicle design is shown to contain an antenna subsystem 205, a bus power system 210, a payload 215, a propulsion system 220, a spacecraft control system 225, and various telemetry and command units. In the embodiment of this figure, the antenna subsystem 205 as shown includes several reflector antennas 230 as well as a calibration source 235. The bus power system 210 is shown to include bus units 240, a power distribution unit (PDU) 245, an integrated power conditioner (IPC) 250, a battery pack 255, a battery charge voltage management (BCVM) unit 260 and solar panels 262. Also, in this figure, the payload 215 includes a payload control processor and data handling unit 265, a data storage unit 270, a low frequency receiver 272, a high frequency receiver 274, and a payload power supply unit 276. The spacecraft control system 225 is shown to have an inertia reference unit (IRU) 278, star scanners 280, a momentum control assembly 282 with momentum wheels 283, a global positioning receiver (GPS) 284 with receiver antennas 285, a squib driver unit (SDU) 286, an acquisition sun sensor 288, a central telemetry and command unit (CTCU) 290, and a spacecraft control processor 292, which includes mechanism drivers 294. The space vehicle design is also shown to include a remote telemetry and command unit (RTCU) 298 and a telemetry and command radio frequency (T&C RF) unit 296 with antennas 297.

Earth Observer Calculations

The following calculations show the required momentum capacity and the required torque capability that are necessary for the Earth observer embodiment of the disclosed agile, net-momentum, spinning space vehicle.

Typical sensor parameters:
Typical Mass:

|  |  |
|---|---|
| Receiver, etc. | ~150 kg |
| Spun Assembly | ~150 kg |
| Total Instrument | ~300 kg |

Typical Spin Rate (See axis 150 in FIG. 1), $\omega_s$: ~30 RPM
Typical Spun Inertia (sensor only): ~130 kg·m$^2$
Angular Momentum (sensor only):

$$H = I\omega_s$$
$$= 140 \text{ kg·m}^2 \cdot 30 \frac{\text{rev}}{\text{min}} \cdot 2\pi \frac{\text{rad}}{\text{rev}} \cdot \frac{1}{60} \frac{\text{rad}}{\text{rev}}$$
$$\approx 450 \text{ N·m·s}$$

Assume an agile sensor (See sensor 110 in FIG. 1) on a spinning bus (See body 105 in FIG. 1), then:
Combined Inertia (sensor and bus):

|  |  |
|---|---|
| Bus Inertia | ≈300 kg·m$^2$ |
| Sensor Inertia | ≈130 kg·m$^2$ |
| Sensor Support | ≈20 kg·m$^2$ |
| Total Inertia, I | ≈450 kg·m$^2$ |

Total space vehicle angular momentum, at 30 RPM, is then:

$$H = I\omega_s$$
$$\approx 450 \text{ kg·m}^2 \cdot 30 \frac{\text{rev}}{\text{min}} \cdot 2\pi \frac{\text{rad}}{\text{rev}} \cdot \frac{1}{60} \frac{\text{rad}}{\text{rev}}$$
$$\approx 1400 \text{ N·m·s}$$
or in English units:
$$\approx 1400 \text{ N·m·s} \cdot 0.2248 \frac{\text{lb}}{\text{N}} \cdot 3.281 \frac{\text{ft}}{\text{m}}$$
$$\approx 1000 \text{ ft-lb·s}$$

To create an agile spinning space vehicle, a counter-rotating momentum wheel is included in the configuration. The counter-rotating momentum wheel provides an equal and opposite match to the space vehicle spinning body's angular momentum.

$$H_{mw} = -H$$

Momentum wheels are currently available that have capacities of 1000 ft-lb-s or greater.

Agility is accomplished by introducing an internal torque, T, between the momentum of the spinning space vehicle body, H, and the counter-rotating momentum wheel, $H_{mw}$. This torque and its reaction result in a unified precession rate, $\omega_p$, of H and $H_{mw}$.

$$T_p = \omega_p \times H$$

This precession rate is accomplished via a command torque, in the body frame, that is commutated between the transverse axes at spin-rate to accomplish the inertial slew. Assuming the spin rate is constant, $\omega_s$, and the desired inertial rate is:

$$\omega_d = [\omega_1, \omega_2]$$

Then, the torque for a constant precession is:

$$T_1 = (I_3 - I_2)\omega_2 \omega_s$$
$$T_2 = (I_1 - I_3)\omega_2 \omega_s$$

To validate the feasibility of the torque actuators, it is necessary to include slew accelerations:

$$T_a = I\alpha$$

So, the components become:

$$T_1 = I_1\alpha_1 + (I_3 - I_2)\omega_2\omega_s$$
$$T_2 = I_2\alpha_2 + (I_1 - I_3)\omega_1\omega_s$$

Typical Transverse Inertias (space vehicle):

$$I_1 \approx 300 \text{ kg·m}^2$$
$$I_2 \approx 325 \text{ kg·m}^2$$

A space vehicle agile enough to overcome orbit rate could keep its average line-of-site fixed relative to an area of interest in order to scan the same area of the Earth multiple times in the same pass.
Typical low earth orbiting (LEO) weather satellite altitude:

$$h \approx 800 \text{ km}$$

Typical orbital period:

$$P \approx 100 \text{ min}$$

Typical orbital angular rate:

$$\omega_o \approx 1 \times 10^{-3} \text{ rad/sec}$$

Chose sufficient agility to overcome orbital motion:

$$\omega_1 \approx \omega_2 \approx 2 \times 10^{-2} \text{ rad/sec}$$

And, choosing a reasonable acceleration:

$$\alpha_1 \approx \alpha_2 \approx 1 \times 10^{-2} \text{ rad/sec}^2$$

Then, the torque actuators need to be sized approximately:

$$T_1 \approx T_2 \approx 10 \text{ Nm}$$

These calculations of the required momentum capacity and the required torque capability demonstrate the feasibility of the disclosed concept because both are within the ranges of the current, state-of-the-art, space-qualified hardware.

The disclosed agile, spinning, weather sensor potentially enables improved weather sensor capabilities because of its ability to accomplish multiple rapid scans of the same area of the Earth.

For instance, at the same scan rate:

$$\omega_s: \sim 30 \text{ RPM}(\sim 3.1 \text{ rad/sec})$$

Figure 3A:
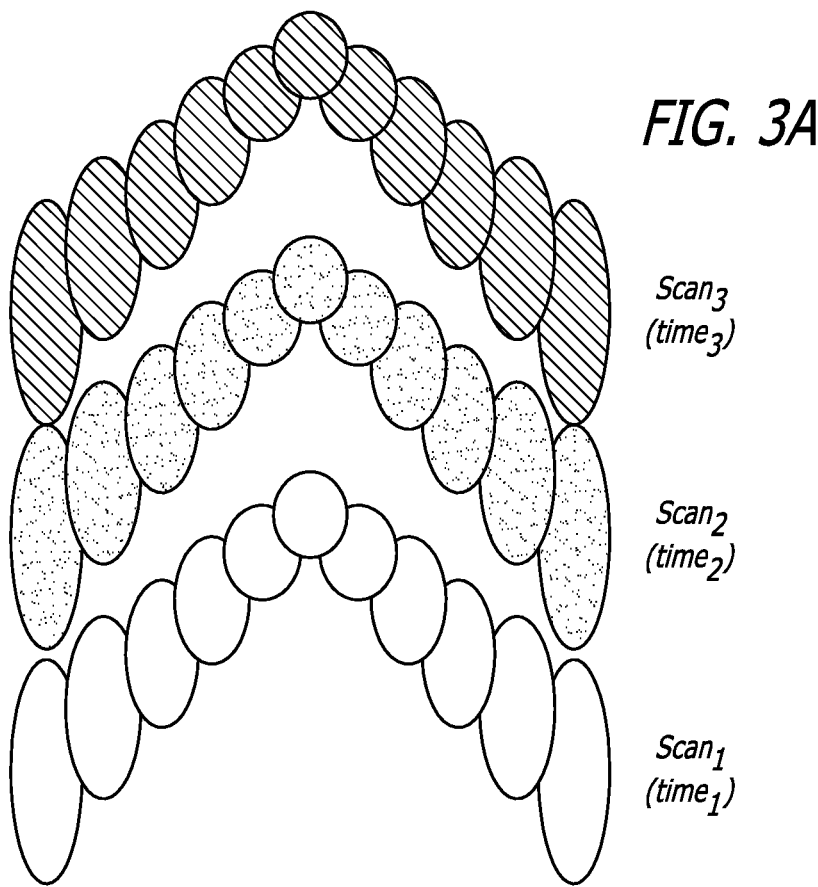
FIG. 3A depicts a scanning swath pattern for a scanning sensor on a prior art spinning space vehicle.

The sensor would be capable of rescanning the same area of interest every two (2) seconds. A conical scanning swath for a typical, non-agile, scanning sensor is depicted in FIG. 3A. FIG. 3A shows a scanning swath pattern for a scanning sensor on a prior art spinning space vehicle.

Figure 3B:
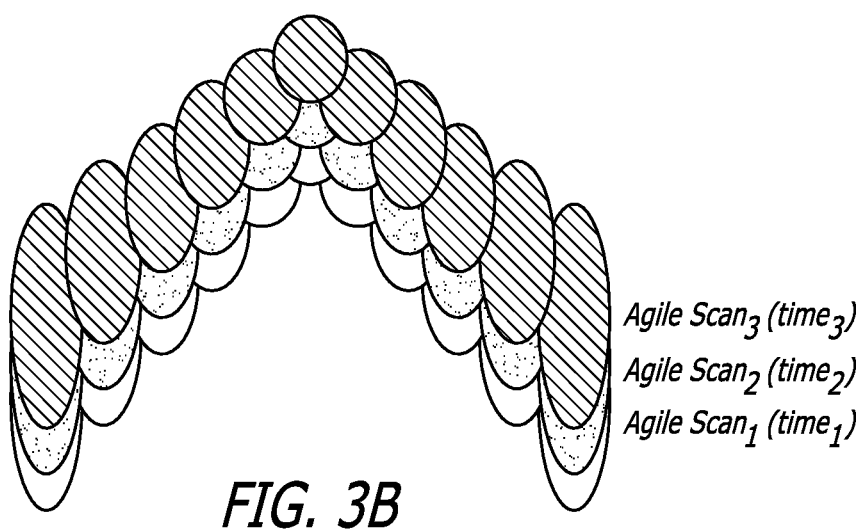
FIG. 3B shows a scanning swath pattern for a scanning sensor on the disclosed agile, zero net-momentum, spinning space vehicle, in accordance with at least one embodiment of the present disclosure.

The disclosed agile, zero net-momentum, spinning space vehicle concept enables the sensor to overlay multiple scans on the same area of observation every two (2) seconds as illustrated in FIG. 3B. FIG. 3B shows a scanning swath pattern for a scanning sensor on the disclosed agile, zero net-momentum, spinning space vehicle, in accordance with at least one embodiment of the present disclosure. This capability allows for improved weather sensors. Time-rate-ofchange sensors can be created by applying back-differencing signal processing techniques to data collected from existing sensors implemented in the type of space vehicle system design presented in this disclosure.

Time-rate-of-change in weather parameter:

[f(AgileScan2(time2)−f(AgileScan1(time1)]/(time2−time1)).

Where current capabilities might include wind velocity or sea surface velocity, this disclosed technique can be used to establish time-rate-of-change in wind velocity (wind acceleration) and/or sea surface acceleration. Such differencing techniques can also be effective at rapidly detecting and isolating short-term changes in otherwise coherent data.

For example, consider an instrument that measures the radiance of the atmosphere.

$$L(v) = \int_0^\infty B[v, T(z)] \frac{d\tau(v,z)}{dz} dz$$

where $B[v,T(z)]$ is the Plank radiance at temperature T at height z, and $\tau(v,z)$ is the atmospheric transmittance from height z to the instrument, and $v$ is the wavenumber (i.e., 1/wavelength). If the instrument makes a set of measurements of radiance at a set of wavenumbers $v_i$ where i=1 to m, then the radiance at a specific wavenumber, $\bar{v}$, is taken in discrete increments of fixed frequencies and the Planck function becomes merely a function of height, $K_i(z)$ $$L_i = L(v_i) = \int_0^\infty B[\bar{v}, T(z)] K_i(z) dz$$

When this set of measurements is linearized, a set of coefficients, $w_j$, is defined for a finite height range of (0,z), thereby enabling the instrument's measurement to represent a profile in altitude. This represents the current state of the art in simple solutions to the inverse problem for sounding measurements:

$$L_i = L(v_i) = \sum_{j=1}^m w_j \int_0^\infty W_j(z) K_i(z) dz = \sum C_{ij} w_j$$

In which case, the measured atmospheric profile is derived by calculating the elements of the square matrix C.

This design of the present disclosure enables the introduction of an additional dimension in this measurement. The instrument's newfound agility will be used to repeat the measurement of the radiance at a different, but nearly adjacent, time sample. Multiple samples are possible, but for purposes of illustration of this concept, consider two time samples, $t_1$ and $t_2$. Where $$L_i(t_1) = \Sigma C_{ij} w_j(t_1)$$

and $$L_i(t_2) = \Sigma C_{ij} w_j(t_2).$$

Then, the first order differential of radiance can be approximated by the difference equation:

$$\frac{\partial L(t)}{\partial t} \approx \frac{L_i(t_2) - L_i(t_1)}{(t_2 - t_1)}$$

Note that the disclosed methodology of designing a control system with a choice of torque actuators that provides agility of greater than an order of magnitude larger than orbit rate ensures that these samples will be taken to be very nearly spatially consistent from one sample to the next. This enables the back-differencing technique to make a good approximation of the first order partial differential in time of the measured quantity, in this example case, the radiance. The capability to provide measurements of the short-term change in the parameters measured by the instrument may be utilized by end users of weather and remote sensors. For example, rapid changes in temperature, between several scan times, may be utilized by end users to detect the ignition of a fire or an explosion. Also, rapid changes in sea surface temperature or wave velocity may be utilized by end users to detect the passing of a naval vessel.

Deep Space Observers

Figure 4:
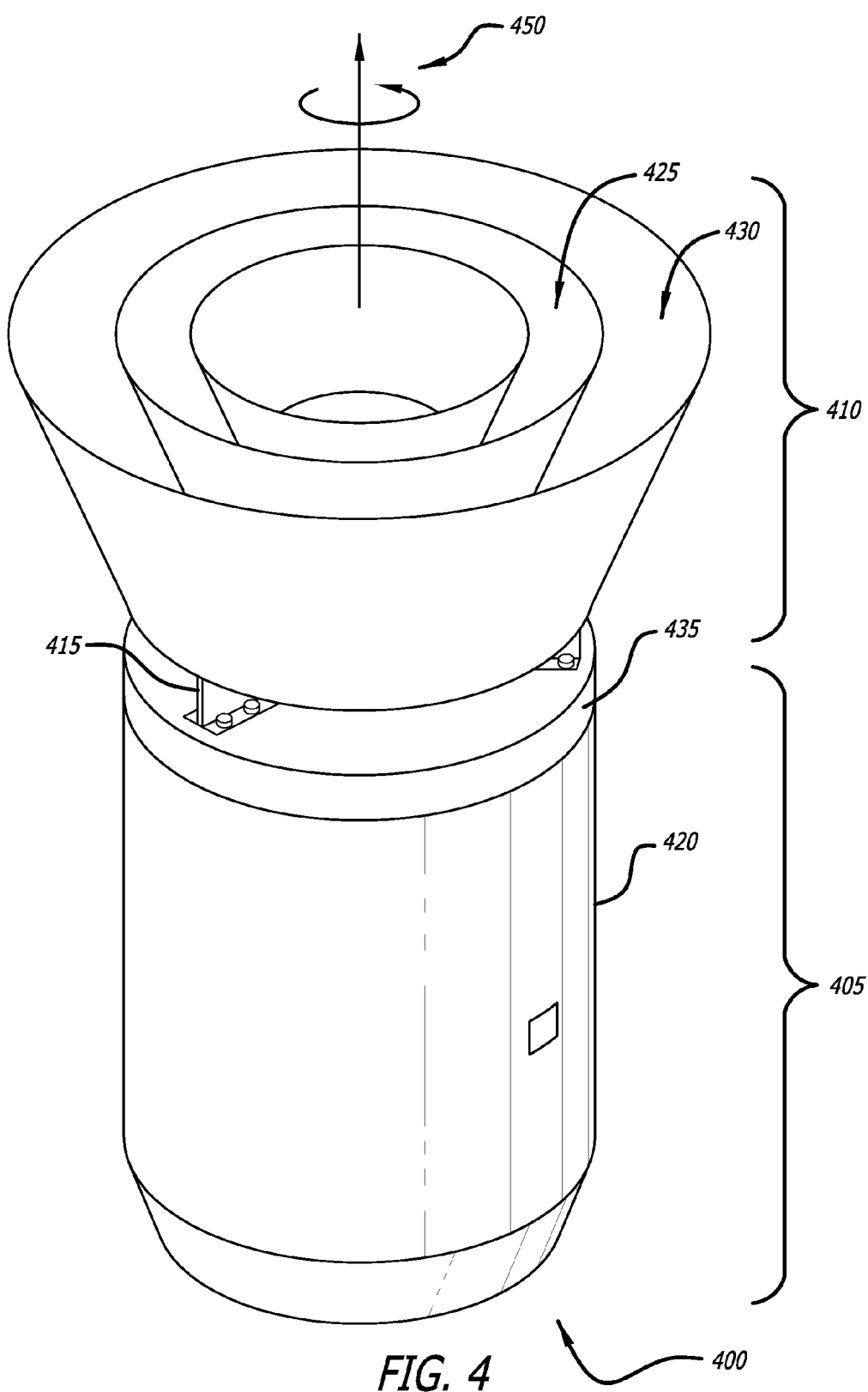
FIG. 4 illustrates a pictorial representation of a deep space observer satellite, in accordance with at least one embodiment of the present disclosure.

FIG. 4 illustrates a pictorial representation of a deep space observer satellite 400, in accordance with at least one embodiment of the present disclosure. In this figure, the deep space observer satellite 400 includes a body 405 and an instrument package 410. The body 405 of the deep space observer satellite 400 has solar panels 420 that are located on its exterior surface. The satellite's instrument package 410 is mounted onto the satellite's body 405 via a mounting interface 415. The instrument package 410 is isolated from mechanical strain by the mounting interface 415. This embodiment eliminates the potential for thermal distortion of the instrument data. In addition, the instrument package is isolated from heat transfer by a thermal isolation material 435 that is mounted to the top of the satellite's body 405. In one or more embodiments, the instrument package 410 includes an antenna collector 425 and a sunshield 430. In this figure, the satellite's 400 spin axis 450 is shown to be aligned with the instrument package's 410 scan axis 450. This allows for the deep space observer satellite 400 to have an enhanced slew maneuverability.

Figure 5:
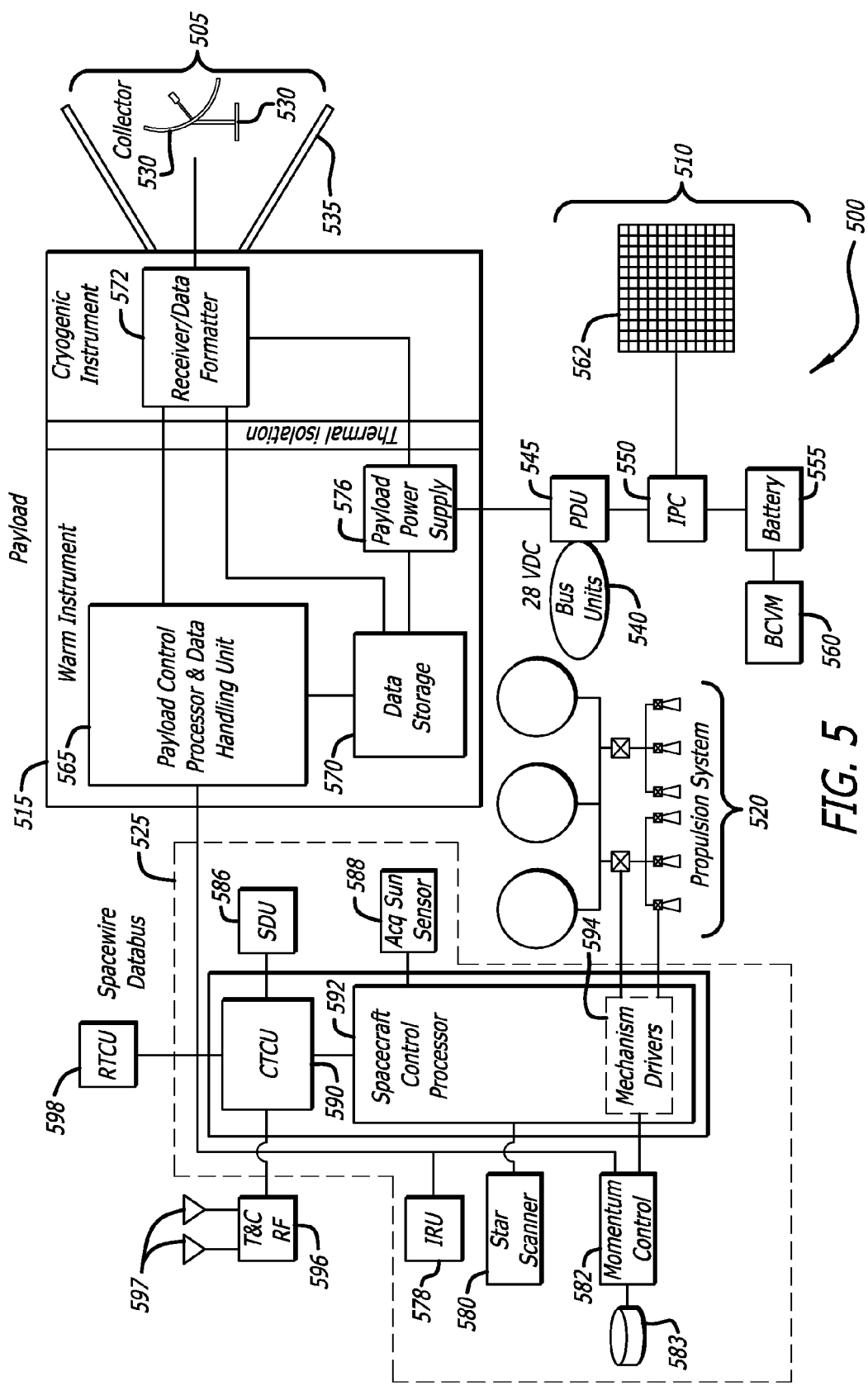
FIG. 5 depicts a space vehicle block diagram of the deep space observer satellite design of FIG. 4, in accordance with at least one embodiment of the present disclosure.

FIG. 5 depicts a space vehicle block diagram 500 of the deep space observer satellite design of FIG. 4, in accordance with at least one embodiment of the present disclosure. The space vehicle design is shown in this figure to contain an antenna subsystem 505, a bus power system 510, a payload 515, a propulsion system 520, a spacecraft control system 525, and various telemetry and command units. In the embodiment of this figure, the antenna subsystem 505 includes a collector 530 and a sunshield 535. Also in this figure, the bus power system 510 is shown to include bus units 540, a power distribution unit (PDU) 545, an integrated power conditioner (IPC) 550, a battery pack 555, a battery charge voltage management (BCVM) unit 560 and solar panels 562.

In this figure, the payload 515 is shown to include two sections, which are a warm instrument section and a cryogenic instrument section. These two sections are separated by thermal isolation. The warm instrument section of the payload 515 includes an instrument control processor and data handling unit 565, a data storage unit 570, and a payload power supply unit 576. The cryogenic instrument section of the payload 515 includes a receiver/data formatter unit 572.

Also in this figure, the spacecraft control system 525 is shown to have an inertia reference unit (IRU) 578, a star scanner 580, a momentum control unit 582 with momentum wheels 583, a squib driver unit (SDU) 586, an acquisition sun sensor 588, a central telemetry and command unit (CTCU) 590, and a spacecraft control processor 592, which includes mechanism drivers 594. Also, the space vehicle design is shown to include a remote telemetry and command unit (RTCU) 598 and a telemetry and command radio frequency (T&C RF) unit 596 with antennas 597.

Deep Space Observers Calculations

The following calculations show the required momentum capacity and the required torque capability that are necessary for the deep space observer embodiment for the disclosed agile, net-momentum, spinning space vehicle.

Typical sensor parameters:
Typical Mass:
Total Instrument ~285 kg
Typical Spin Rate (See axis 450 in FIG. 4), $\omega_s$: ~4 RPM
Typical Spun Inertia (total instrument): ~220 kg·m²
Angular Momentum (sensor only):

$$H = I\omega_s$$
$$= 220 \text{ kg}\cdot\text{m}^2 \cdot 4\frac{\text{rev}}{\text{min}} \cdot 2\pi\frac{\text{rad}}{\text{rev}} \cdot \frac{1}{60}\frac{\text{min}}{\text{sec}}$$
$$\approx 90 \text{ N}\cdot\text{m}\cdot\text{s}$$

Assume an agile sensor (See sensor 410 in FIG. 4), which includes sunshades (See sunshield 430 in FIG. 4), that is attached to a spinning bus (See body 405 in FIG. 4), with its boresight aligned with the spin vector (See axis 450 in FIG. 4) then:

Combined Inertia (sensor and bus):

| | |
|---|---|
| Bus Inertia | ≈300 kg·m² |
| Sensor Inertia | ≈220 kg·m² |
| Sensor Support | ≈30 kg·m² |
| Total Inertia, I | ≈550 kg·m² |

The sensor is isolated from mechanical strain by a kinematic mount (See mounting interface 415 in FIG. 4) and from heat transfer by thermal isolation material (See thermal isolation material 435 in FIG. 4). Total space vehicle angular momentum, at 30 RPM, is then:

$$H = I\omega_s$$
$$\approx 550 \text{ kg}\cdot\text{m}^2 \cdot 4\frac{\text{rev}}{\text{min}} \cdot 2\pi\frac{\text{rad}}{\text{rev}} \cdot \frac{1}{60}\frac{\text{rad}}{\text{rev}}$$
$$\approx 230 \text{ N}\cdot\text{m}\cdot\text{s}$$

or in English units:

$$\approx 230 \text{ N}\cdot\text{m}\cdot\text{s} \cdot 0.2248\frac{\text{lb}}{\text{N}} \cdot 3.281\frac{\text{ft}}{\text{m}}$$
$$\approx 170 \text{ ft-lb}\cdot\text{s}$$

To create an agile spinning space vehicle, a counter-rotating momentum wheel is included in the configuration that provides an equal and opposite match to the space vehicle spinning body's angular momentum.

$$H_{mw} = -H$$

Momentum wheels are currently available that have capacities of 170 ft-lb-s or greater.

A deep space observer requires agility to point its boresight to anti-nadir at all times despite orbit rate. That orbit rate can be derived from the intended orbit: polar circular orbit at an altitude of ~1500 km. Ignoring secondary effects from orbital perturbations (nodal precession, etc.), the required agility rate is derived from:

Orbital Period:

$$P = 2\pi\sqrt{\frac{a^3}{\mu}} = 2\pi\sqrt{\frac{(6378+1500 \text{ km})^3}{3.986012\times 10^5 \text{km}^3/\text{s}^2}} \sim 7000 \text{ secs(about 116 min)}$$

Minimum agility=

$$\omega_o \approx \frac{2\pi}{7000}\text{rad/sec} \sim 1\times 10-3 \text{ rad/sec}$$

Choose additional margin in capability to overcome orbit rate:

$$\omega_1 \approx \omega_2 \approx 1\times 10^{-2} \text{ rad/sec}$$

Agility is accomplished by introducing an internal torque, T, between the momentum of the spinning space vehicle body, H, and the counter-rotating momentum wheel, $H_{mw}$. This torque and its reaction result in unified precession rate, $\omega_p$, of H and $H_{mw}$.

$$T_p = \omega_p \times H$$

This precession rate is accomplished via a command torque, in the body frame, that is commutated between the transverse axes at spin-rate to accomplish the inertial slew. Assuming the spin rate is constant, $\omega_s$, and the desired inertial rate is:

$$\omega_d = [\omega_1, \omega_2]$$

Then, the torque for a constant precession is:

$$T_1 = (I_3 - I_2)\omega_2\omega_s$$

$$T_2 = (I_1 - I_3)\omega_2\omega_s$$

To validate the feasibility of the torque actuators, it is necessary to include slew accelerations:

$$T_a = I\alpha$$

So, the components become:

$$T_1 = I_1\alpha_1 + (I_3 - I_2)\omega_2\omega_s$$

$$T_2 = I_2\alpha_2 + (I_1 - I_3)\omega_1\omega_s$$

Typical Transverse Inertias (space vehicle):

$$I_1 \approx 300 \text{ kg}\cdot\text{m}^2$$

$$I_2 \approx 325 \text{ kg}\cdot\text{m}^2$$

And choosing a consistent acceleration:

$$\alpha_1 \approx \alpha_2 \approx 1\times 10^{-2} \text{ rad/sec}^2$$

Then, the torque actuators for a deep space observer need to be sized approximately:

$$T_1 \approx T_2 \approx 4 \text{ Nm}$$

These calculations of the required momentum capacity and the required torque capability demonstrate the feasibility of a dedicated, agile, spinning deep space observer space vehicle concept because both are within ranges of current state-of-the-art, space qualified, hardware.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. An agile, controlled zero net-momentum, spinning space vehicle, the space vehicle comprising:
    a body; and
    an instrument package,
        wherein the instrument package is mounted directly onto the body such that the agile, controlled zero net-momentum, spinning space vehicle can point the instrument package not only along the space vehicle's orbital velocity vector, but in any direction within the space vehicle's field of regard, and
        wherein the instrument package comprises a sensor capable to produce overlapping multiple beam scan patterns on a same area of observation.

2. The space vehicle of claim 1, wherein the space vehicle's spin axis is aligned with a scan axis of the instrument package.

3. The space vehicle of claim 1, wherein the space vehicle experiences zero net-momentum on orbit by the inclusion of a counter-rotating momentum storage device.

4. The space vehicle of claim 1, wherein the instrument package is a scanning microwave imaging/sounding instrument.

5. The space vehicle of claim 4, wherein the scanning microwave imaging/sounding instrument is utilized as an Earth climate and weather sensor.

6. The space vehicle of claim 1, wherein the instrument package is a scanning optical sensor.

7. The space vehicle of claim 1, wherein the instrument package is a scanning communication device.

8. The space vehicle of claim 1, wherein a scan axis of the instrument package is aligned towards Earth for Earth scanning.

9. The space vehicle of claim 1, wherein a scan axis of the instrument package is aligned towards space for deep space scanning.

10. The space vehicle of claim 1, wherein the space vehicle is a low earth orbiting (LEO) satellite.

11. The space vehicle of claim 1, wherein the space vehicle is a medium earth orbit (MEO) satellite.

12. The space vehicle of claim 1, wherein the space vehicle is a geosynchronous earth orbit (GEO) satellite.

13. The space vehicle of claim 1, wherein the space vehicle is an interplanetary space vehicle.

14. The space vehicle of claim 1, wherein the instrument package comprises at least one satellite antenna subsystem.

15. The space vehicle of claim 1, wherein the instrument package comprises at least one star sensor.

16. The space vehicle of claim 1, wherein the instrument package comprises at least one heater disk.

17. The space vehicle of claim 1, wherein the space vehicle further comprises solar panels that are located on the space vehicle's exterior surface.

18. The space vehicle of claim 1, wherein the instrument package is capable to perform rapid, successive scans of the same region, thereby allowing for back-differencing signal processing techniques to be employed.

19. A method for providing an agile, controlled zero net-momentum, spinning space vehicle, the method comprising:
    providing a body;
    providing an instrument package; and
    mounting the instrument package directly onto the body such that the agile, controlled zero-net momentum, spinning space vehicle can point the instrument package not only along the space vehicle's orbital velocity vector, but in any direction within the space vehicle's field of regard, and
        wherein the instrument package comprises a sensor capable to produce overlapping multiple beam scan patterns on a same area of observation.

20. The method of claim 19, wherein the space vehicle's spin axis is aligned with a scan axis of the instrument package.

21. The method of claim 19, wherein the method further comprises counter-rotating a momentum storage device, thereby causing the space vehicle to experience zero net-momentum on orbit.

22. The method of claim 19, wherein the instrument package is a scanning microwave imaging/sounding instrument.

* * * * *